(12) United States Patent
Gu et al.

(10) Patent No.: US 10,108,636 B2
(45) Date of Patent: Oct. 23, 2018

(54) DATA DEDUPLICATION METHOD

(71) Applicant: SAMSUNG ELECTRONICS CO., LTD., Suwon-si, Gyeonggi-do (KR)

(72) Inventors: Bon-Cheol Gu, Seongnam-si (KR); Ju-Pyung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 519 days.

(21) Appl. No.: 14/711,647

(22) Filed: May 13, 2015

(65) Prior Publication Data

US 2015/0339316 A1  Nov. 26, 2015

(30) Foreign Application Priority Data

May 20, 2014  (KR) .................. 10-2014-0060420

(51) Int. Cl.
 *G06F 17/30* (2006.01)
(52) U.S. Cl.
 CPC .................. *G06F 17/30159* (2013.01)
(58) Field of Classification Search
 CPC ......... G06F 17/30159; G06F 17/30156; G06F 17/30631; G06F 17/30321; G06F 17/30371; G06F 3/0641; G06F 3/0608
 USPC ....... 707/664, 692, 693, 812, 813, 821, 830, 707/696, 698
 See application file for complete search history.

(56) References Cited

U.S. PATENT DOCUMENTS

| | | | |
|---|---|---|---|
| 6,026,198 A | 2/2000 | Okada | |
| 6,215,906 B1 | 4/2001 | Okada | |
| 8,103,050 B2 | 1/2012 | Lefebvre et al. | |
| 8,165,414 B1 | 4/2012 | Yagnik | |
| 2011/0307447 A1* | 12/2011 | Sabaa | H04L 67/2842 707/637 |
| 2012/0016882 A1* | 1/2012 | Tofano | H03M 7/30 707/747 |
| 2012/0121194 A1 | 5/2012 | Yagnik | |
| 2013/0018853 A1* | 1/2013 | Jayaraman | G06F 3/0641 707/692 |
| 2013/0318051 A1* | 11/2013 | Kumar | G06F 17/30156 707/692 |
| 2014/0164413 A1 | 6/2014 | Matsumoto et al. | |
| 2015/0019815 A1* | 1/2015 | Aronovich | G06F 3/0641 711/129 |

(Continued)

FOREIGN PATENT DOCUMENTS

| | | |
|---|---|---|
| JP | 09-275349 | 10/1997 |
| JP | 2004-110606 | 4/2004 |
| JP | 2010-256951 | 11/2010 |

(Continued)

*Primary Examiner* — Greta L Robinson
(74) *Attorney, Agent, or Firm* — Volentine, Whitt & Francos, PLLC

(57) ABSTRACT

Data deduplication is performed by separating data into a plurality of data chunks that correspond to first through $N^{th}$ positions and include symbols, calculating discrimination indices of the positions using frequencies of the symbols in the different positions; arranging the order of the positions based on values of the discrimination indices; and generating fingerprints of the data through combination of data chunks that correspond to a number of the positions, based on the arranged order of the positions.

17 Claims, 18 Drawing Sheets

(56) References Cited

U.S. PATENT DOCUMENTS

2015/0026135 A1* 1/2015 Aronovich ........ G06F 17/30159
                                                  707/692
2015/0302022 A1* 10/2015 Gu .................... G06F 17/30336
                                                  707/692

FOREIGN PATENT DOCUMENTS

| JP | 2012-073684   | 4/2012  |
| JP | 2013-030104   | 2/2013  |
| KR | 0323208       | 7/2001  |
| KR | 2008-0098878 A | 11/2008 |

* cited by examiner

FIG. 4A

|  | 1ST | 2ND | 3RD | 4TH |
|---|---|---|---|---|
| DATA1(401) | B | B | A | D |
| DATA2(403) | D | C | A | C |
| DATA3(405) | B | C | A | A |
| DATA4(407) | B | C | A | C |
| DATA5(409) | D | C | A | B |
| DISCRIMINATING FACTOR | 2 | 1 | 0 | 3 |
| ENTROPY | 1.459 | 1.252 | 0.650 | 1.918 |

| POSITION VECTOR (425) | 4 | 1 | 2 | 3 |
|---|---|---|---|---|

FIG. 4B

|      | A | B | C | D | $H_i$ | $Q_i$ |
|------|---|---|---|---|-------|-------|
| 1ST  | 0 | 3 | 0 | 2 | 0.971 | 6.755 |
| 2ND  | 0 | 1 | 4 | 0 | 0.722 | 8     |
| 3RD  | 5 | 0 | 0 | 0 | 0     | 11.610|
| 4TH  | 1 | 1 | 2 | 1 | 1.922 | 2     |

|  | 4TH | 1ST | 2ND | 3RD |
|---|---|---|---|---|
| FINGERPRINT 1(431) | D | B | B | A |
| FINGERPRINT 2(433) | C | D | C | A |
| FINGERPRINT 3(435) | A | B | C | A |
| FINGERPRINT 4(437) | C | B | C | A |
| FINGERPRINT 5(439) | B | D | C | A |

FIG. 6A

|             | 1ST | 2ND | 3RD | 4TH |
|-------------|-----|-----|-----|-----|
| DATA1(401)  | B   | B   | A   | D   |
| DATA2(403)  | D   | C   | A   | C   |
| DATA3(405)  | B   | C   | A   | A   |
| DATA4(407)  | B   | C   | A   | C   |
| DATA5(409)  | D   | C   | A   | B   |
| DATA6(411)  | C   | A   | D   | B   |

FIG. 6B

|      | A | B | C | D | $Q_i$  |
|------|---|---|---|---|--------|
| 1ST  | 0 | 3 | [1] | 2 | 6.755  |
| 2ND  | [1] | 1 | 4 | 0 | 8      |
| 3RD  | 5 | 0 | 0 | [1] | 11.610 |
| 4TH  | 1 | [2] | 2 | 1 | 4      |

|     | A | B | C | D | $Q_i$ |
|-----|---|---|---|---|-------|
| 1ST | 0 | [2] | 1 | 2 | 4 |
| 2ND | 1 | 1 | [3] | 0 | 4.755 |
| 3RD | [4] | 0 | 0 | 1 | 8 |
| 4TH | 1 | 2 | [1] | 1 | 2 |

$Q = [\ 4 \quad 4.755 \quad 8 \quad 2\ ]$ $L = [\ 4 \quad 1 \quad 2 \quad 3\ ]$

FIG. 7A

|  | BUC | AUD |
|---|---|---|
| 1ST | 3 | 2 |
| 2ND | 5 | 0 |
| 3RD | 0 | 5 |
| 4TH | 3 | 2 |

FIG. 7B

|     | A | B | C | D |
|-----|---|---|---|---|
| 1ST | 0 | 3 | 0 | 2 |
| 4TH | 1 | 1 | 2 | 1 |

FIG.8

|            | 1ST | 2ND | 3RD | 4TH | FLAG |
|------------|-----|-----|-----|-----|------|
| DATA1(401) | B   | B   | A   | D   | -    |
| DATA2(403) | D   | C   | A   | C   | -    |
| DATA3(405) | B   | C   | A   | A   | -    |
| DATA4(407) | B   | C   | A   | C   | o    |
| DATA5(409) | D   | C   | A   | B   | -    |
| DATA6(411) | C   | A   | D   | B   | n    |

FIG. 9A

|           | 1ST | 2ND | 3RD | 4TH | 5TH |
|-----------|-----|-----|-----|-----|-----|
| DATA1(501)| B   | B   | A   | D   | -   |
| DATA2(503)| D   | C   | A   | -   | -   |
| DATA3(505)| B   | C   | A   | A   | C   |
| DATA4(507)| B   | C   | A   | C   | D   |
| DATA5(509)| D   | C   | A   | B   | -   |
| DATA6(511)| C   | A   | D   | B   | -   |

FIG. 9B

|     | A | B | C | D | ø |
|-----|---|---|---|---|---|
| 1ST | 0 | 3 | 1 | 2 | 0 |
| 2ND | 1 | 1 | 4 | 0 | 0 |
| 3RD | 5 | 0 | 0 | 1 | 0 |
| 4TH | 1 | 2 | 1 | 1 | 1 |
| 5TH | 0 | 0 | 1 | 1 | 4 |

# DATA DEDUPLICATION METHOD

CROSS-REFERENCE TO RELATED APPLICATIONS

This application is based on and claims priority from Korean Patent Application No. 10-2014-0060420, filed on May 20, 2014 in the Korean Intellectual Property Office, the disclosure of which is incorporated herein in its entirety by reference.

BACKGROUND

1. Field of the Inventive Concept

The present inventive concept relates to a data deduplication method.

2. Background

As performance of computer systems that include a distributed storage system has improved, the scale of data to be processed in the computer system has also increased, and securing a storage space for the data has become problematic. In particular, expanding equipment so as to secure the storage space in a distributed storage system that stores large-scale data is expensive, and thus it would be advantageous to reduce wasted storage space through an efficient operation of given storage space. Accordingly, there has been a need for more efficient data management of large amounts of data that include duplicate data.

Japanese Patent Publication No. 2010-256951 discloses a method that attempts to address this problem by dividing the data into segments, calculating eigenvalues for segments that appear to be similar, and comparing eigenvalues as an indication of the degree of similarity.

However, conventional methods need to be improved. Better methods for identifying and removing duplicate data are needed.

SUMMARY

To address this concern, according to one aspect of the inventive concept a data deduplication method comprises separating data into a plurality of data chunks that correspond to first through $N^{th}$ positions and include symbols, where N is a natural number;

calculating discrimination indices of the first through $N^{th}$ positions; arranging the order of the first through $N^{th}$ positions based on values of the discrimination indices; and generating fingerprints of the data through combination of the data chunks that correspond to the first through $N^{th}$ positions based on the arranged order of the first through $N^{th}$ positions, wherein the number of kinds of symbols included in a plurality of pieces of data that include the data is L, where L is a natural number, and the discrimination indices are calculated using a frequency matrix that includes N horizontal columns indicating the first through $N^{th}$ positions and L vertical columns indicating the frequencies of the symbols for the first through $N^{th}$ positions.

According to another aspect of the inventive concept, a data deduplication method comprises separating data into a plurality of data chunks that correspond to first through $N^{th}$ positions and include symbols, where N is a natural number; calculating discrimination indices of the first through $N^{th}$ positions using the frequencies of the symbols for the first through $N^{th}$ positions; arranging the order of the first through $N^{th}$ positions based on values of the discrimination indices; and generating fingerprints of the data through combination of M of the data chunks that correspond to M of the first through $N^{th}$ positions, based on the arranged order of the first through $N^{th}$ positions, where M is a natural number less than or equal to N.

According to yet another aspect of the inventive concept, an apparatus for performing a data deduplication method, comprises an interface; an I/O device; a memory; a power supply; a bus, wherein the interface, I/O device, memory, and power supply are connected to one another through the bus; and a controller, processor, or logic device configured to: separate data into a plurality of data chunks that correspond to first through $N^{th}$ positions and include symbols, where N is a natural number; calculate discrimination indices of the first through $N^{th}$ positions using the frequencies of the symbols for the first through $N^{th}$ positions; arrange the order of the first through $N^{th}$ positions based on values of the discrimination indices; and generate fingerprints of the data through combination of M of the data chunks that correspond to M of the first through $N^{th}$ positions, based on the arranged order of the first through $N^{th}$ positions, where M is a natural number less than or equal to N.

BRIEF DESCRIPTION OF THE DRAWINGS

The above and other objects, features and advantages of the present inventive concept will be more apparent from the following detailed description taken in conjunction with the accompanying drawings, in which:

FIG. 4A is a schematic view for explaining generation of position vectors according to a data deduplication method based on an exemplary embodiment of the present inventive concept;

FIG. 4B is a schematic view for explaining operation of position vectors using entropy of information according to a data deduplication method based on an exemplary embodiment of the present inventive concept;

FIG. 5 is a schematic view for explaining generation of a fingerprint using position vectors explained with reference to FIGS. 4A and 4B according to a data deduplication method based on an exemplary embodiment of the present inventive concept;

FIGS. 6A to 6C are schematic views for explaining a data deduplication method based on another embodiment of the present inventive concept;

FIG. 7A is a schematic view for explaining a data deduplication method based on still another embodiment of the present inventive concept;

FIG. 7B is a schematic view for explaining a data deduplication method based on still another embodiment of the present inventive concept;

FIG. 8 is a schematic view for explaining a data deduplication method based on still another embodiment of the present inventive concept;

FIGS. 9A and 9B are schematic views for explaining a data deduplication method based on still another embodiment of the present inventive concept;

DETAILED DESCRIPTION OF THE EMBODIMENTS

Figure 1:
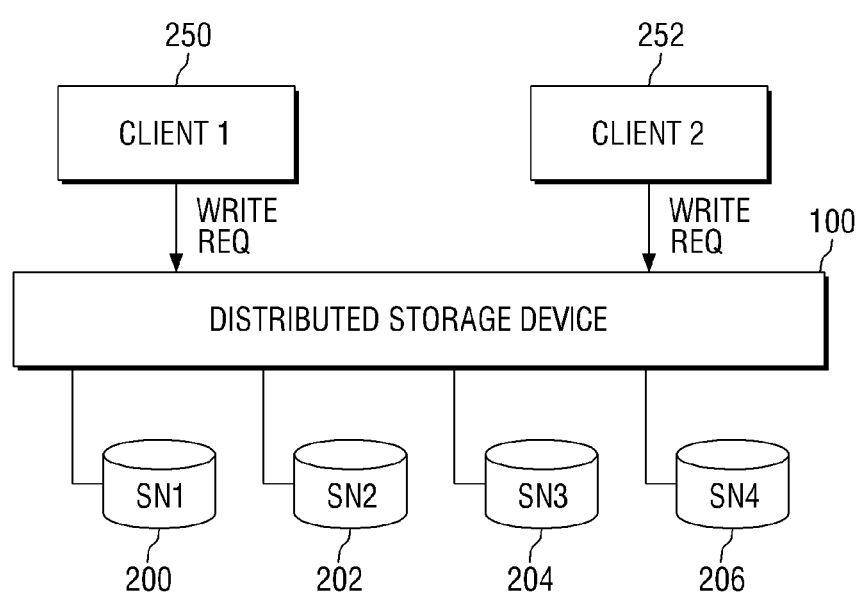
FIG. 1 is a schematic diagram for explaining a distributed storage device that performs a data deduplication method based on the present inventive concept.

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, preferred embodiments will be described with reference to the accompanying drawings.

Referring to FIG. 1, the distributed storage device 100 performs data input/output work through reception of a data input/output request from one or more clients 250, 252. For example, the distributed storage device 100 may store data (i.e., some amount or block of data), for which a write is requested from the one or more clients 250, 252, in one or more storage nodes 200, 202, 204, 206 in a distributed manner, and may retrieve data, in response to a read request received from the one or more clients 250, 252, from the one or more storage nodes 200, 202, 204, 206 in order to transmit the read data to the clients 250, 252.

In some embodiments, the distributed storage device 100 may be a single server or a multi-server, and the distributed storage device 100 may further include a metadata management server that manages metadata for the data stored in the storage nodes 200, 202, 204, 206. Each of the clients 250, 252 may be a respective terminal that can access the distributed storage device 100 through a network including, for example, a computer, such as a desk-top computer or a server, or a mobile device, such as a cellular phone, a smart phone, a tablet PC, a notebook computer, or a PDA (Personal Digital Assistants), though not limited to those examples. Each of the storage nodes 200, 202, 204, 206 may be, but is not limited to, a storage device, such as a HDD (Hard Disk Drive), a SSD (Solid State Drive), or a NAS (Network Attached Storage), and may include one or more processing units. The clients 250, 252, the distributed storage device 100, and the storage nodes 202, 202, 204, 206 may be connected to each other through a wire network, such as a LAN (Local Area Network), a WAN (Wide Area Network), or a wireless network, such as Wi-Fi, Bluetooth, or cellular network for example.

Figure 2:
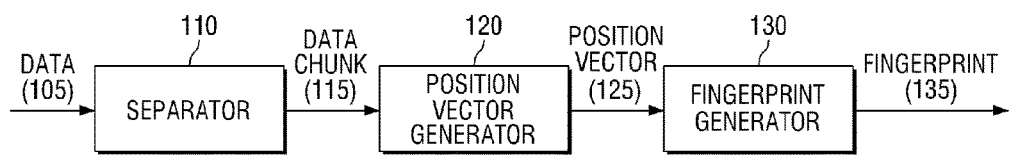
FIG. 2 is a schematic diagram for explaining a data deduplication apparatus based on an exemplary embodiment of the present inventive concept.

Referring to FIG. 2, a distributed storage device in some embodiments may include a separator 110, a position vector generator 120, and a fingerprint generator 130. The separator 110 may separate the data 105 for which the write is requested into a plurality of data chunks 115, which may include symbols. The divided data chunks 115 may correspond to first through $N^{th}$ positions within the data 105, where N is a natural number. For example, among the plurality of separated data chunks 115 from the data 105, the first data chunk may correspond to the first position, the second data chunk may correspond to the second position, and the $N^{th}$ data chunk may correspond to the $N^{th}$ position. The first through $N^{th}$ positions are not inherent to specific data. That is, such positions may also be applied to any data stored in the storage nodes 202, 202, 204, 206 together with the data 105. Accordingly, other data stored in the storage nodes 202, 202, 204, 206 together with the data 105 may be separated into a plurality of data chunks, each data chunk corresponding to a different position within its respective data.

The position vector generator 120 may calculate discrimination indices for the first through $N^{th}$ positions that correspond to the positions of the plurality of data chunks 115 of the data 105, and may arrange the order of the first through $N^{th}$ positions based on values of the discrimination indices. In some embodiments, the position vector generator 120 records the arranged order of the first through $N^{th}$ positions in a position vector 125.

The discrimination index indicates the degree of discrimination (differentiation) of the whole data with respect to a part of the data chunks. For example, if it is assumed that two pieces of data (A, B) and (A, C) are stored in the storage (here, A, B, and C mean data chunks or symbols), the data chunks or symbols that are in the first position are both equal to A, and therefore cannot be discriminated (i.e., differentiated) from each other. However, the data chunks or symbols that are in the second position, B and C, are different, and thus the two pieces of data can be discriminated from each other. Accordingly, the second position (in which B and C are positioned) has higher discrimination than does the first position, and thus a higher discrimination index can be assigned to the second position than to the first position. The details of the method for calculating/assigning a discrimination index will be described below with reference to FIG. 4A.

In the embodiment illustrated in FIG. 2, the position vector generator 120 determines discrimination indices for the first through $N^{th}$ positions that correspond to the positions of the plurality of data chunks 115, and assigns higher discrimination index values to positions having higher discrimination. (In other possible embodiments a lower discrimination index value could indicate higher discrimination.) After all the discrimination indices for the first through $N^{th}$ positions are determined, the position vector generator 120 may produce a position vector 125 that will order the first through $N^{th}$ positions based on the order of their discrimination index values. For example, in embodiments where the discrimination index value is set to become larger as the discrimination becomes higher, the first through $N^{th}$ positions may be arranged in descending order of their discrimination index values. By contrast, in the case where a low discrimination index value indicates higher discrimination, the first through $N^{th}$ positions may be arranged in ascending order of discrimination index value. Yet other possible embodiments could reverse the position vector so that the higher discrimination positions could be at the end. However, for ease of understanding, this discussion will hereafter describe an exemplary embodiment in which the position vector 125 is arranged in descending order of discrimination index values with high discrimination index values indicating high discrimination.

After determining discrimination index values for the different positions, the position vector generator 120 records the arranged order of the first through $N^{th}$ positions on the position vector 125 in order of discrimination index value. Accordingly, the position vector 125 may have a plurality of elements corresponding to the first through $N^{th}$ positions, and the order of the elements may correspond to the arranged order of the first through $N^{th}$ positions. For example, a position vector (4, 1, 2, 3) indicates that the discrimination is highest for the data in the fourth position, and then the first position, the second position, and the third position, in order of descending discrimination values.

The fingerprint generator 130 may then generate a "fingerprint" through combination of data chunks that correspond to the first through $N^{th}$ positions, based on the arranged order of the first through $N^{th}$ positions. In some embodiments the fingerprint generator 130 may generate the fingerprint through combination of the data chunks that correspond to the first through $N^{th}$ positions based on the order of the first through $N^{th}$ positions recorded on the position vectors 125. For example, if a position vector is (4, 1, 2, 3), the fingerprint may be generated through combination in order of data chunks that correspond to the fourth position, the first position, the second position, and the third position. In some possible embodiments the position vector may be generated as a vector having N elements that include all of the entire first through $N^{th}$ positions, while the fingerprint generation unit 130 uses only M elements (where M is a natural number that is smaller than N) among the elements of the position vector, and based on this, the fingerprint may be generated through combination of only those M data chunks.

Figure 3:
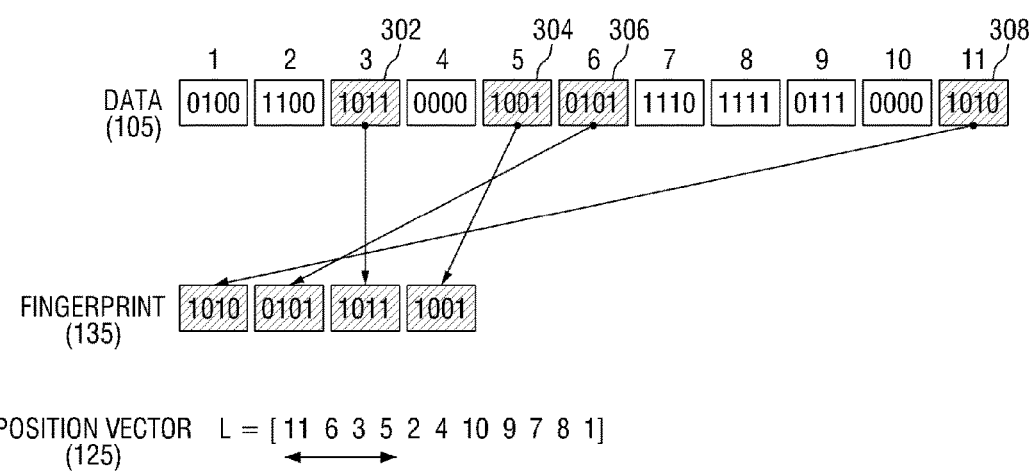
FIG. 3 is a schematic diagram for explaining a data deduplication method based on an exemplary embodiment of the present inventive concept.

FIG. 3 illustrates an example of this method according to this exemplary embodiment. The 105 are separated into a plurality of data chunks corresponding to first through eleventh positions. If, after calculating a respective discrimination index value for each of the first through eleventh positions, it is determined that the discrimination indices of the first through eleventh positions, in descending order, are found in the eleventh position 308, the sixth position 306, the third position 302, and the fifth position 304, etc., then the position vector generator 120 may generate a position vector 125 of (11, 6, 3, 5, 2, 4, 10, 9, 7, 8, 1) for example, based on those discrimination index values. Next, the fingerprint generator 130 may generate a fingerprint 135 through combination of only the four data chunks corresponding to the first four elements (11, 6, 3, 5) of the position vector 125. That is, the fingerprint generator 130 may generate the fingerprint 135 through combination of the data chunk 308 that corresponds to the eleventh position, the data chunk 306 that corresponds to the sixth position, the data chunk 302 that corresponds to the third position, and the data chunk 304 that corresponds to the fifth position.

With reference to FIG. 4A to further explain generation of position vectors according to an exemplary embodiment, each piece of data 401, 403, 405, 407, 409 may be separated into four data chunks. Here, the data chunk may include symbols, such as A, B, C, and D. Four data chunks that are separated from each piece of data 401, 403, 405, 407, 409 may correspond to the first through fourth positions. For example, the first data chunks B, D, B, B, and D that are respectively separated from the data 401, 403, 405, 407, 409 may correspond to first respective positions, and the second data chunks B, C, C, C, and C that are respectively separated from the data 401, 403, 405, 407, 409 may correspond to second respective positions. In the same manner, the third data chunks A, A, A, A, and A that are respectively separated from the data 401, 403, 405, 407, 409 may correspond to third respective positions, and the fourth data chunks D, C, A, C, and B that are respectively separated from the data 401, 403, 405, 407, 409 may correspond to fourth respective positions.

As for the respective positions that corresponds to the data 401, 403, 405, 407, 409, the fourth position has the highest discrimination. Accordingly, the data 401, 403, 405, 407, 409 can be discriminated by only the data chunks D, C, A, C, and B that correspond to the fourth position, without the necessity of considering the data chunks that correspond to other positions (i.e., first to third positions). On the other hand, the third position has the lowest discrimination. Since the data chunks that correspond to the third position are equal to each other, that is, are all A, it is not possible to discriminate the data 401, 403, 405, 407, 409 by only the data chunks that correspond to the third position. It can be seen that in this embodiment, the positions in order of descending discrimination are the fourth position, the first position, the second position, and the third position. Accordingly, discrimination indices of 3, 2, 1, and 0 may be respectively given to the fourth position, the first position, the second position, and the third position to indicate the order of the first through fourth positions.

Here, the discrimination indices may be determined using entropy of information. The entropy of information may indicate an amount of information that one symbol can be composed of, and specifically, may be determined using the frequency of duplicate data chunks among data chunks that correspond to the same position in a plurality of pieces of data. For example, if the frequency of the duplicate data chunks among the data chunks that correspond to the fourth position in the plurality of pieces of data is lower than the frequency of the duplicate data chunks among the data chunks that correspond to the first position, then the discrimination index of the fourth position may be determined as higher than the discrimination index of the first position. A detailed process of calculating this will be described later with reference to FIG. 4B. In the order of discrimination index values determined as above, the position vector 425 records the order of the first through fourth positions. That is, the position vector 425 may be expressed as (4, 1, 2, 3).

For explaining operation of position vectors using entropy of information based on one possible embodiment, a frequency matrix generated based on the data 401, 403, 405, 407, 409 is illustrated on FIG. 4B. Here, symbols included in the data 401, 403, 405, 407, 409 are classified into four kinds (i.e., A, B, C, and D), and the frequency matrix includes four horizontal columns that indicate the first through fourth positions and four vertical columns that indicate the frequencies of the symbols for the first through fourth positions.

The discrimination indices of the first through fourth positions may be obtained in some embodiments through calculation of Q vectors that express the entropy of information. The Q vector $Q_i$ of the $i^{th}$ position among the first through fourth positions (where i is a natural number from 1 through 4, inclusive) may be calculated by Equation 1 below.

$$Q_i = \Sigma_j F_{ij} \times \log F_{ij} \qquad (1)$$

In Equation 1, $Q_i$ is a Q vector element of the $i^{th}$ position, and $F_{ij}$ is a value that corresponds to the $j^{th}$ vertical column for the $i^{th}$ horizontal column of the frequency matrix, where j is a natural number from 1 through 4, inclusive. For example, $Q_1$ is an element that corresponds to the first position among the Q vector elements, $(F_{11}, F_{12}, F_{13}, F_{14})$ is (0, 3, 0, 2), and $Q_2$ is an element that corresponds to the second position among the Q vector elements, and $(F_{21}, F_{22}, F_{23}, F_{24})$ is (0, 1, 4, 0). Accordingly, the Q vector that is calculated by Equation 1 may be (6.755, 8, 11.610, 2). Through this, the order of the first through fourth positions may be arranged in the ascending order of $Q_i$ values. Thus in this embodiment, since the Q vector elements are determined as $Q_4 < Q_1 < Q_2 < Q_3$, the first through fourth positions are arranged in the order of fourth, first, second, and third, and the position vector L may be expressed as (4, 1, 2, 3).

In some possible embodiments, if new data is added or a part of the data is deleted, the frequency matrix may be re-calculated. For instance, if $F_{ij}$ value is changed to a different value $G_{ij}$, the Q vector may be re-calculated by Equation 2 below.

$$Q_i' = Q_i - F_{ij} \times \log F_{ij} + G_{ij} \times \log G_{ij} \qquad (2)$$

In Equation 2, $Q_i'$ is a new Q vector element, $Q_i$ is an existing Q vector element, $F_{ij}$ is an existing value that corresponds to the $j^{th}$ vertical column for the $i^{th}$ horizontal column of the frequency matrix, and $G_{ij}$ is a new value that corresponds to the $j^{th}$ vertical column for the $i^{th}$ horizontal column of the frequency matrix. This will be described later with reference to FIGS. 6A to 6C.

In other possible embodiments, the order of the first through fourth positions may be determined through calculation of the entropy of information H as calculated by Equation 3 below.

$$H_i = \log N - 1/N \times Q_i \qquad (3)$$

In Equation 3, $Q_i$ is a Q vector element of the $i^{th}$ position, N is the total number of symbols for the $i^{th}$ position, and $H_i$ is a discrimination index of the $i^{th}$ position.

In yet other possible embodiments, the order of the first through fourth positions may be determined through calculation of the entropy of information H as calculated by Equations 4 and 5 below.

$$p_{ij} = F_{ij}/N \qquad (4)$$

$$H_i = \Sigma_j p_{ij} \times \log(1/p_{ij}) \qquad (5)$$

In Equations 3 and 4 above, $p_{ij}$ is a ratio of the $j^{th}$ symbol in the $i^{th}$ position, $F_{ij}$ is a value that corresponds to the $j^{th}$ vertical column for the $i^{th}$ horizontal column of the frequency matrix, N is the total number of symbols for the $i^{th}$ position, and $H_i$ is a discrimination index of the $i^{th}$ position. Accordingly, for this example the entropy of information H is calculated as (0.971, 0.722, 0, 1.922). In this embodiment using the entropy of information H, the first through fourth positions may be arranged in the descending order of $H_i$ values. That is, in this embodiment, since the H values are determined as $H_4 > H_1 > H_2 > H_3$, the first through fourth positions are arranged in the order of fourth, first, second, third. The position vector L may be expressed as (4, 1, 2, 3).

In still further possible embodiments, other equations may be used.

Referring to FIG. 5, for explaining generation of a fingerprint using position vectors with reference to FIGS. 4A and 4B, according to an exemplary embodiment fingerprints 431, 433, 435, 437, 439 may be generated from the data 401,

403, 405, 407, 409 using the position vector 425. Specifically, the fingerprint 431 may be generated to through combination of the data chunks D, B, B, and A corresponding to the fourth, first, second, and third positions, respectively, based on the position vector 425, which is (4, 1, 2, 3). In the same manner, the fingerprint 433 may be generated through combination of the data chunks C, D, E, and A again corresponding to the fourth, first, second, and third positions, respectively, based on the same position vector 425 of (4, 1, 2, 3). In order to determine whether there is any duplicate data between the data 401, 403, 405, 407, 409, the fingerprints 431, 433, 435, 437, 439 as generated above make it possible to rapidly determine whether the data 401, 403, 405, 407, 409 are equal to each other.

FIGS. 6A and 6B illustrate a case in which data 411 is added to data 401, 403, 405, 407, 409. In this case, since the new data 411 is added and thus the frequencies of the symbols are changed, it is necessary to re-calculate the frequency matrix. Specifically, since the data 411 include symbols C, A, D, and B in the first, second, third, and fourth positions, respectively, the values in the positions indicated by rectangles in FIG. 6B should be updated by increasing them by 1. If the values of the frequency matrix are changed as described above, the Q vectors calculated by Equation 1 may be re-calculated by Equation 2. For example, if a symbol B is added in the fourth position, the new $Q_4'$ value may be calculated by $Q_4 - F_{42} \times \log F_{42} + G_{42} \times \log G_{42}$. Here, $F_{42}$ is an existing value (i.e., 1) that corresponds to the second vertical column for the fourth horizontal column of the frequency matrix, and $G_{42}$ is the new value (i.e., 2) that corresponds to the second vertical column for the fourth horizontal column of the frequency matrix. Accordingly, the $Q_4'$ value becomes 4. If the magnitude relationship between $Q_1$ to $Q_4$ is changed, the position vector L may also be updated.

FIGS. 6A and 6C illustrate a case in which data 407 is deleted. In this case, since the data 407 is deleted and thus the frequencies of the symbols are changed, it is necessary to re-calculate the frequency matrix. Specifically, since the data 407 include symbols B, B, A, and C in the first, second, third, and fourth positions, respectively, the values in the positions indicated by rectangles in FIG. 6C should be updated by decreasing them by 1. If the values of the frequency matrix are changed as described above, the Q vectors calculated by Equation 1 may be re-calculated by Equation 2. For example, if a symbol B is deleted from the fourth position, the new $Q_1'$ value may be calculated by $Q_1 - F_{12} \times \log F_{12} + G_{12} \times \log G_{12}$. Here, $F_{12}$ is an existing value (i.e., 3) that corresponds to the second vertical column for the first horizontal column of the frequency matrix, and $G_{12}$ is the new value (i.e., 2) that corresponds to the second vertical column for the first horizontal column of the frequency matrix. Accordingly, the $Q_1'$ value becomes 4. If the magnitude relationship between $Q_1$ to $Q_4$ is changed, the position vector L may also be updated.

Figure 7A:
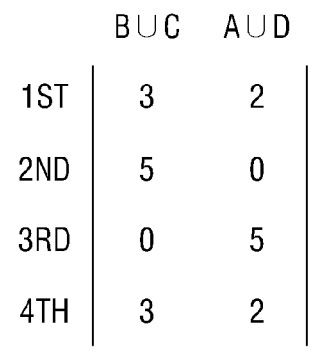

In still another possible embodiment symbols may include a first symbol and a second symbol, which are different from each other, and the frequency matrix may include a vertical column that indicates a value obtained by adding the frequency of the first symbol to the frequency of the second symbol. For example, the frequency matrix illustrated in FIG. 7A includes only two vertical columns that indicate four symbols of A, B, C, and D. Specifically, the first vertical column may include values obtained by adding the frequencies of the symbols B and C to each other, and the second vertical column may include values obtained by adding the frequencies of the symbols A and D. In this embodiment, symbols that have correlations or high interconnectivity may be handled as one symbol, so that the size of the frequency matrix can be reduced. If the size of the frequency matrix is reduced, memory space for storing the frequency matrix can be saved.

Figure 7B:
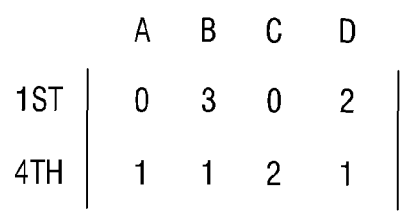

In still another possible embodiment the frequency matrix may include only K horizontal columns for partial positions among the first through $N^{th}$ positions, where K is a natural number between 1 and N, inclusive. For example, the frequency matrix illustrated in FIG. 7B includes only horizontal columns for the first and fourth positions. In this embodiment, whether the data is duplicated is determined through selection of partial positions having relatively high discrimination. For example, if the first and fourth positions among the first through $N^{th}$ positions have a high data discrimination index (which can substantially help the determination of whether the data is duplicated) but the second and third positions do not have high data discrimination, the data deduplication may be performed considering only the first and fourth positions.

With reference to FIG. 8, in still another possible embodiment data deduplication may employ a "lazy update" technique that delays the performance of the re-calculation work of the frequency matrix when the data is added or deleted as described above with reference to FIGS. 6A to 6C. Specifically, if it is necessary to re-calculate the frequency matrix due to addition or deletion of data, a flag may be set with respect to the added data or deleted data before the frequency matrix is re-calculated. Thereafter, recalculation of the frequency matrix may be performed at an appropriate time dictated by a task scheduler. For example, if the data 411 is added to and the data 407 is deleted from the data 401, 403, 405, 407, 409, flags may be set for only the data 407 and 411, and the frequency matrix need not be immediately re-calculated. In FIG. 8, although a flag "n" is set to the added data 411 and a flag "o" is set to the deleted data 407, the detailed types of the flags are not limited thereto.

In still another possible embodiment of the present inventive concept, referring to FIG. 9A the lengths of data 501, 503, 505, 507, 509, 511 may be different from one another. For example, the length of the data 501, 509, and 511 may include four symbols, whereas the length of the data 505 and 507 may include five symbols. In this case, referring to FIG. 9B, a vertical column that indicates a blank symbol Ø may be added to the frequency matrix to calculate the discrimination indices from the data 501, 503, 505, 507, 509, 511 having different lengths. For example, since the data 501, 509, and 511 each include only four symbols, it may be considered that they include virtual blank symbols in their fifth positions. In the same manner, since the data 503 include only three symbols, it may be considered that the data include a virtual blank symbol in their fourth and fifth positions. Through this, since there is one symbol C of the data 505, one symbol D of the data 507, and four blank symbols of the data 501, 502, 509, and 511 in the fifth position, the fifth horizontal column becomes (0, 0, 1, 1, 4).

Figure 10:
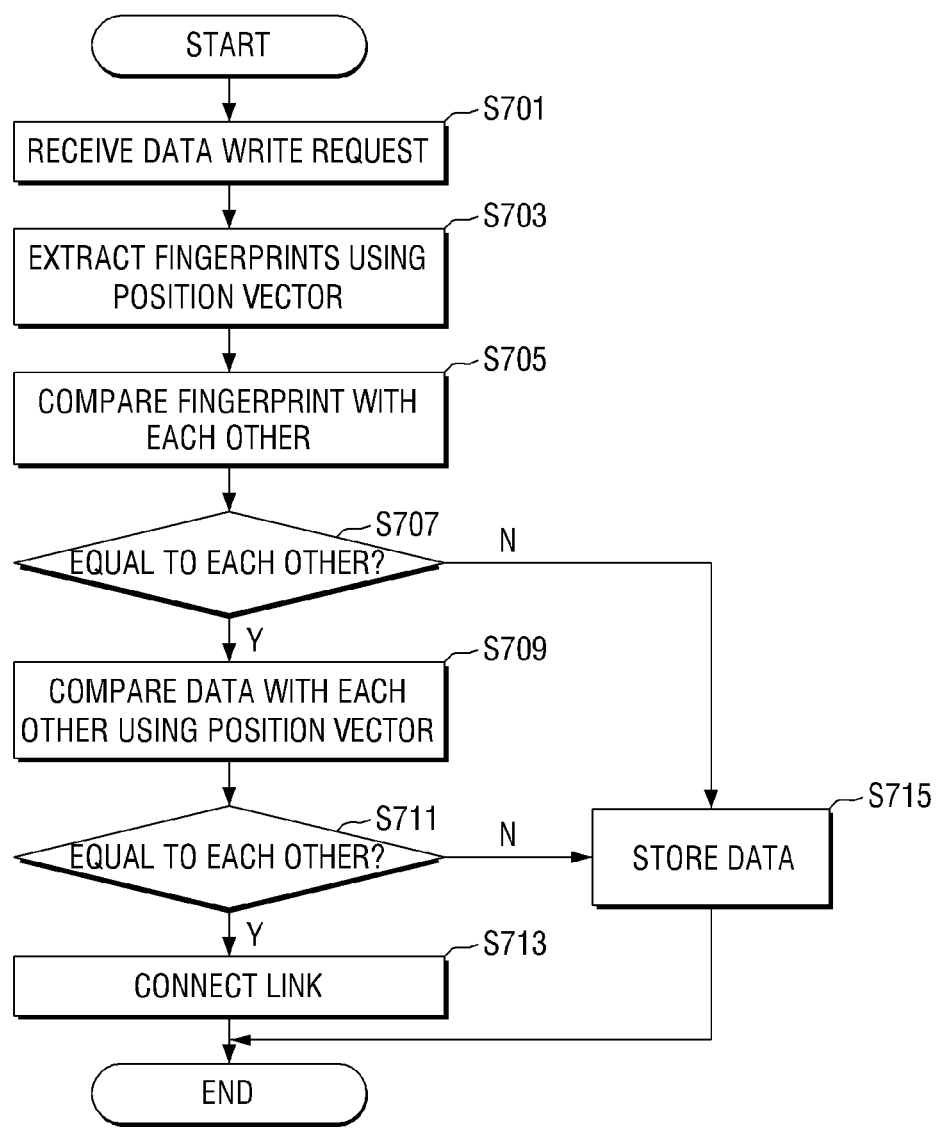
FIGS. 10 and 11 are flowcharts for explaining a data deduplication method based on an exemplary embodiment of the present inventive concept.
Figure 11:
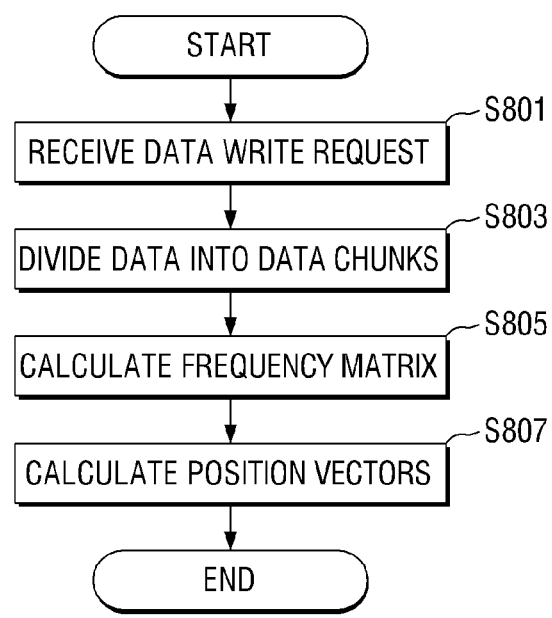

Referring to FIGS. 10 and 11, in an exemplary embodiment a data write request may be received from a user or a client 250 (S701), and a fingerprint for the write-requested data may be extracted through construction of a position vector (S703). Constructing the position vector may include separating the data into a plurality of data chunks that correspond to first through $N^{th}$ positions (S803), where N is a natural number, and calculating discrimination indices for the first through $N^{th}$ positions. Specifically, the discrimination indices may be determined through calculation of the Q vectors using the above-described frequency matrix or calculation of the entropy of information H using the frequency matrix (S805). Further, the constructing the position vector may also include arranging the order of the first through $N^{th}$ positions based on discrimination index values, and recording the order on the position vector (S807). Alternatively, extracting the fingerprint may include generating the fingerprint through combination of the data chunks that correspond to the first through $N^{th}$ positions based on the order of the first through $N^{th}$ positions recorded on the position vector.

The method may further include determining whether two or more pieces of data are duplicate data through comparison of the fingerprints of the two or more pieces of data with each other (S705). Here, the two or more pieces of data may include, for example, first data pre-stored in the storage and second data of which a write is requested. If the fingerprints of the first data and the second data are different from each other (S707—N), the second data is different from the first data and thus may be stored separately in the storage (S715). Conversely, if the fingerprints of the first data and the second data are equal to each other (S707—Y), whether the first data and the second data are duplicate data may be determined through comparison of the data in the unit of a data chunk based on the order of the first through $N^{th}$ data recorded on the position vector (S709). If the first data and the second data are different from each other (S711—N), the second data may be stored separately in the storage (S715). Conversely, if the first data and the second data are equal to each other (S711—Y), the second data is not stored in the storage, but instead a link for the first data that is equal to the second data is generated (S713).

Based on various embodiments, fingerprints for performing the data deduplication may be efficiently generated. Using the frequency matrix and the Q vectors, the entropy of information can be efficiently calculated, and if the data is added or deleted, the position vectors can be re-calculated with superior time complexity of O (M) (where, M is the number of divided data chunks).

Figure 12:
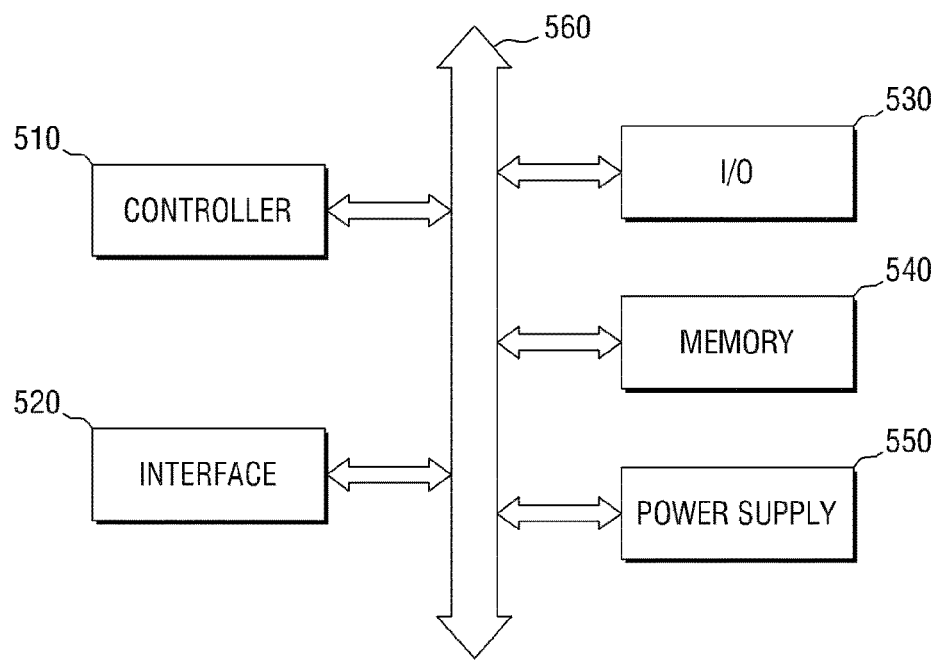
FIG. 12 is a schematic block diagram for explaining an electronic system that includes a semiconductor device based on an exemplary embodiment of the present inventive concept.

Referring to FIG. 12, a data deduplication apparatus based on various embodiments may include a controller 510, an interface 520, an input/output (I/O) device 530, a memory 540, a power supply 550, and a bus 560.

The controller 510, the interface 520, the I/O device 530, the memory 540, and the power supply 550 may be connected to each other through the bus 560. The bus 560 corresponds to paths through which data is transferred. The controller 510 may include at least one of a microprocessor, a microcontroller, and/or logic devices that can perform functions similar to the functions thereof to process data. The interface 520 may function to transfer data to a communication network or to receive the data from the communication network. The interface 520 may be of a wired or wireless type. For example, the interface 520 may include an antenna or a wire/wireless transceiver. The I/O device 530 may include a keypad and a display device to input/output data. The memory 540 may store data and/or commands. In some possible embodiments, the semiconductor device may be provided as a partial constituent element of the memory 540. The power supply 550 may convert a power input from an outside and provide the converted power to the respective constituent elements 510 to 540.

Figure 13:
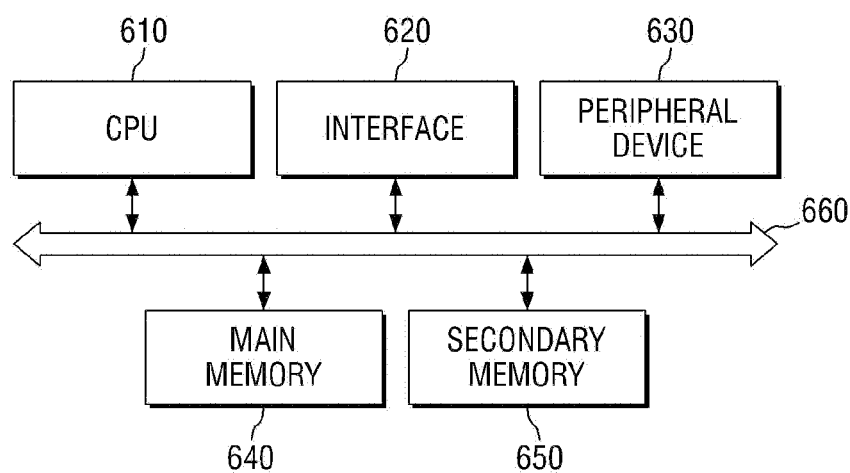
FIG. 13 is a schematic block diagram for explaining an application example of a storage system that includes a semiconductor device based on an exemplary embodiment of the present inventive concept.

Referring to FIG. 13, in an exemplary embodiment the data deduplication apparatus may include a CPU 610, an interface 620, a peripheral device 630, a main memory 640, a secondary memory 650, and a bus 660.

The CPU 610, the interface 620, the peripheral device 630, the main memory 640, and the secondary memory 650 may be connected to each other through the bus 660. The bus 660 corresponds to paths through which data is transferred. The CPU 610 may include a controller, an arithmetic-logic unit, and the like, and may execute a program to process data. The interface 620 may function to transfer data to a communication network or to receive the data from the communication network. The interface 620 may be of a wired or wireless type. For example, the interface 620 may include an antenna or a wire/wireless transceiver. The peripheral device 630 may include a mouse, a keyboard, a display, and a printer, and may input/output data. The main memory 640 may transmit/receive data with the CPU 610, and may store data and/or commands that are required to execute the program. Based on some embodiments, the semiconductor device may be provided as partial constituent elements of the main memory 640. The secondary memory 650 may include a nonvolatile memory, such as a magnetic tape, a magnetic disc, a floppy disc, a hard disk, or an optical disk, and may store data and/or commands. The secondary memory 650 can store data even in the case where a power of the electronic system is intercepted.

In addition, an electronic system that implements the data deduplication method based on some possible embodiments may be provided as one of various constituent elements of electronic devices, such as a computer, a UMPC (Ultra Mobile PC), a work station, a net-book, a PDA (Personal Digital Assistants), a portable computer, a web tablet, a wireless phone, a mobile phone, a smart phone, an e-book, a PMP (Portable Multimedia Player), a portable game machine, a navigation device, a black box, a digital camera, a 3-dimensional television receiver, a digital audio recorder, a digital audio player, a digital picture recorder, a digital picture player, a digital video recorder, a digital video player, a device that can transmit and receive information in a wireless environment, one of various electronic devices constituting a home network, one of various electronic devices constituting a computer network, one of various electronic devices constituting a telematics network, an RFID device, or one of various constituent elements constituting a computing system.

As used herein, a "natural number" is a whole number greater than or equal to 1 (e.g., 1, 2, 3, and so on).

Although preferred embodiments have been described for illustrative purposes, those skilled in the art will appreciate that various modifications, additions and substitutions are possible, without departing from the scope and spirit of the inventive concept as disclosed in the accompanying claims.

What is claimed is:

1. A data deduplication method executed by a processor, the method comprising:
   separating data into a plurality of data chunks that correspond to first through $N^{th}$ positions and include symbols, where N is a natural number;
   calculating discrimination indices of the first through $N^{th}$ positions;
   arranging an order of the first through $N^{th}$ positions based on values of the discrimination indices; and
   generating fingerprints of the data through combination of the data chunks that correspond to the first through $N^{th}$ positions based on the arranged order of the first through $N^{th}$ positions, wherein:
   a number of kinds of symbols included in a plurality of pieces of data that include the data is L, where L is a natural number, and
   the discrimination indices are calculated using a frequency matrix that includes N horizontal columns indicating the first through $N^{th}$ positions and L vertical columns indicating frequencies of the symbols for the first through $N^{th}$ positions.

2. The data deduplication method of claim 1, wherein a discrimination index of an $i^{th}$ position among the first through $N^{th}$ positions is calculated by Equation 1 below, $$Q_i = \Sigma_j F_{ij} \times \log F_{ij} \qquad (1)$$

where i is a natural number less than or equal to N, $Q_i$ is a Q vector element of the $i^{th}$ position, and $F_{ij}$ is a value that corresponds to a $j^{th}$ vertical column for an $i^{th}$ horizontal column of the frequency matrix, where j is a natural number less than or equal to L.

3. The data deduplication method of claim 2, including, if an $F_{ij}$ value is changed to a different value $G_{ij}$, recalculating a discrimination index on a basis of a new Q vector that is calculated by Equation 2 below, $$Q_i' = Q_i - F_{ij} \times \log F_{ij} + G_{ij} \times \log G_{ij} \qquad (2)$$

where $Q_i'$ is a new Q vector element, $Q_i$ is an existing Q vector element, $F_{ij}$ is an existing value that corresponds to the $j^{th}$ vertical column for the $i^{th}$ horizontal column of the frequency matrix, and $G_{ij}$ is a new value that corresponds to the $j^{th}$ vertical column for the $i^{th}$ horizontal column of the frequency matrix.

4. The data deduplication method of claim 2, wherein the discrimination index of the $i^{th}$ position is calculated by Equation 3 below, $$H_i = \log N - 1/N \times Q_i \qquad (3)$$

where $Q_i$ is a Q vector element of the $i^{th}$ position, N is a total number of symbols for the $i^{th}$ position, and $H_i$ is the discrimination index of the $i^{th}$ position.

5. The data deduplication method of claim 1, wherein a discrimination index of an $i^{th}$ position for the first through $N_{th}$ positions is calculated by Equations 4 and 5 below, where i is a natural number less than or equal to N, $$p_{ij} = F_{ij}/N \qquad (4)$$

$$H_i = \Sigma_j p_{ij} \times \log(1/p_{ij}) \qquad (5)$$

wherein $p_{ij}$ is a ratio of a $j^{th}$ symbol in the $i^{th}$ position, $F_{ij}$ is a value that corresponds to a $j^{th}$ vertical column for an $i^{th}$ horizontal column of the frequency matrix, N is a total number of symbols for the $i^{th}$ position, and $H_i$ is the discrimination index of the $i^{th}$ position, where j is a natural number less than or equal to L.

6. The data deduplication method of claim 1, including re-calculating the frequency matrix if new data is added to the plurality of pieces of data or a part of the plurality of pieces of data is deleted.

7. The data deduplication method of claim 6, wherein re-calculating the frequency matrix comprises setting a flag with respect to the added data or the deleted data before re-calculating the frequency matrix.

8. The data deduplication method of claim 1, wherein:
the symbols comprise a first symbol and a second symbol that are different from each other, and
the frequency matrix includes a vertical column indicating a value that is obtained by adding a frequency of the first symbol to a frequency of the second symbol.

9. The data deduplication method of claim 1, wherein the frequency matrix comprises only K horizontal columns for a part of the first through $N^{th}$ positions, where K is a natural number less than or equal to N.

10. The data deduplication method of claim 1, wherein:
the symbols further comprise blank symbols; and
the discrimination indices are calculated using the frequency matrix that includes the N horizontal columns and (L+1) vertical columns indicating the frequencies of the symbols for the first through $N^{th}$ positions and the blank symbols.

11. A data deduplication method executed by a processor, the method comprising:
separating data into a plurality of data chunks that correspond to first through $N^{th}$ positions and include symbols, where N is a natural number;
calculating discrimination indices of the first through $N^{th}$ positions using frequencies of the symbols for the first through $N^{th}$ positions;
arranging an order of the first through $N^{th}$ positions based on values of the discrimination indices; and
generating fingerprints of the data through combination of M of the data chunks that correspond to M of the first through $N^{th}$ positions, based on the arranged order of the first through $N^{th}$ positions, where M is a natural number less than or equal to N, wherein:
a number of kinds of symbols included in a plurality of pieces of data that include the data is L, where L is a natural number, and
a discrimination index of an $i^{th}$ position among the first through $N^{th}$ positions is calculated by Equation 6 below, where i is a natural number less than or equal to N, $$Q_i = \Sigma_j F_{ij} \times \log F_{ij} \qquad (6)$$

where $Q_i$ is a Q vector element of the $i^{th}$ position, and F is a frequency of a $j^{th}$ symbol for the $i^{th}$ position, where j is a natural number less than or equal to L.

12. The data deduplication method of claim 11, wherein if an $F_{ij}$ value is changed to a different value $G_{ij}$, a discrimination index is re-calculated on a basis of a new Q vector that is calculated by Equation 7 below, $$Q_i' = Q_i - F_{ij} \times \log F_{ij} + G_{ij} \times \log G_{ij} \qquad (7)$$

where $Q_i'$ is a new Q vector element, $Q_i$ is an existing Q vector element, $F_{ij}$ is an existing value of the frequency of the $j^{th}$ symbol in the $i^{th}$ position, and $G_{ij}$ is a new value of the frequency of the $j^{th}$ symbol in the $i^{th}$ position.

13. The data deduplication method of claim 11, wherein generating the fingerprints of the data includes recording an arranged order of at least M of the first through $N^{th}$ positions on a position vector.

14. The data deduplication method of claim 13, wherein:
M is less than N;
the position vector includes at least M elements that indicate at least M positions, and
the generation of the fingerprints is performed through combination of only those data chunks that correspond to first through $M^{th}$ elements of the position vector.

15. An apparatus for performing a data deduplication method, the apparatus comprising:
an interface;
an I/O device;
a memory;
a power supply;
a bus, wherein the interface, I/O device, memory, and power supply are connected to one another through the bus; and
a controller, processor, or logic device configured to:
separate data into a plurality of data chunks that correspond to first through $N^{th}$ positions and include symbols, where N is a natural number;

calculate discrimination indices of the first through $N^{th}$ positions using frequencies of the symbols for the first through $N^{th}$ positions;

arrange an order of the first through $N^{th}$ positions based on values of the discrimination indices; and generate fingerprints of the data through combination of M of the data chunks that correspond to M of the first through $N^{th}$ positions, based on the arranged order of the first through $N^{th}$ positions, where M is a natural number less than or equal to N, wherein:

a number of kinds of symbols included in a plurality of pieces of data that include the data is L, where L is a natural number, and the discrimination indices are calculated using a frequency matrix that includes N horizontal columns indicating the first through $N^{th}$ positions and L vertical columns indicating the frequencies of the symbols for the first through $N^{th}$ positions.

16. The apparatus of claim 15, wherein:

a discrimination index of an $i^{th}$ position among the first through $N^{th}$ positions is calculated by Equation 6 below, where i is a natural number less than or equal to N, $$Q_i = F_{ij} \times \log F_{ij} \qquad (6)$$

where $Q_i$ is a Q vector element of the $i^{th}$ position, and $F_{ij}$ is a frequency of a $j^{th}$ symbol for the $i^{th}$ position, where j is a natural number less than or equal to L.

17. The apparatus of claim 16, wherein:

M is less than N;

generating the fingerprints of the data includes recording an arranged order of at least M of the first through $N^{th}$ positions in a position vector that includes at least M elements that indicate at least the M positions, and the generation of the fingerprints is performed through combination of only those data chunks that correspond to first through $M^{th}$ elements of the position vector.

* * * * *